(12) United States Patent
Nakayama

(10) Patent No.: US 10,748,357 B2
(45) Date of Patent: Aug. 18, 2020

(54) WAVEFORM ESTIMATING DEVICE, WAVEFORM ESTIMATING METHOD, AND WAVEFORM ESTIMATING PROGRAM

(71) Applicant: FUJITSU LIMITED, Kawasaki-shi, Kanagawa (JP)

(72) Inventor: Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 15/949,910

(22) Filed: Apr. 10, 2018

(65) Prior Publication Data
US 2018/0315259 A1 Nov. 1, 2018

(30) Foreign Application Priority Data
Apr. 26, 2017 (JP) .................. 2017-087364

(51) Int. Cl.
*G07C 5/08* (2006.01)
*G01C 21/36* (2006.01)
*G01S 19/51* (2010.01)
*B60W 40/00* (2006.01)

(52) U.S. Cl.
CPC .......... *G07C 5/0808* (2013.01); *B60W 40/00* (2013.01); *G01C 21/3697* (2013.01); *G01S 19/51* (2013.01)

(58) Field of Classification Search
CPC ... G07C 5/0808; G01S 19/51; G01C 21/3697; B60W 40/00; B60W 40/10; B60W 40/08; B60W 2050/0057; B60W 2550/22; B60W 2550/20; B60W 2550/10; B60W 2540/18; B60W 2040/0872; B60W 2040/0818
See application file for complete search history.

(56) References Cited

U.S. PATENT DOCUMENTS

| 9,704,403 B2* | 7/2017 | Chen ................ B60W 30/09 |
| 9,725,036 B1* | 8/2017 | Tarte ................ B60Q 9/00 |
| 2010/0109881 A1* | 5/2010 | Eskandarian ........ A61B 5/7267 340/575 |
| 2014/0025257 A1* | 1/2014 | Komoguchi .......... B60Q 5/005 701/36 |
| 2015/0039186 A1* | 2/2015 | Okuda ................ B60W 50/14 701/41 |
| 2015/0291095 A1* | 10/2015 | Chien ................ B60W 30/08 348/148 |
| 2016/0035220 A1* | 2/2016 | Paromtchik .......... G08G 1/0137 701/117 |

(Continued)

FOREIGN PATENT DOCUMENTS

| JP | 11-227490 | 8/1999 |
| JP | 2000-185575 | 7/2000 |
| JP | 2001-219761 | 8/2001 |

*Primary Examiner* — Dale W Hilgendorf
*Assistant Examiner* — Alexander C. Bost
(74) *Attorney, Agent, or Firm* — Fujitsu Patent Center

(57) ABSTRACT

A waveform estimating method performed by a computer, the waveform estimating method including: estimating a first vibration component of less than a first frequency in a period from a present time to a time preceding by a half wavelength of the first frequency, using an input waveform in the period, the input waveform corresponding to a driving trajectory of a vehicle traveling on a roadway; and calculating a second vibration component of the first frequency or higher in the period by subtracting the first vibration component from the input waveform.

7 Claims, 17 Drawing Sheets

(56) References Cited

U.S. PATENT DOCUMENTS

| | | | |
|---|---|---|---|
| 2016/0132054 A1* | 5/2016 | Eigel | B60W 50/14 |
| | | | 701/23 |
| 2018/0111628 A1* | 4/2018 | Tamagaki | G05D 1/0061 |
| 2018/0170424 A1* | 6/2018 | Tatsukawa | B60W 10/20 |
| 2018/0237007 A1* | 8/2018 | Adam | B60W 30/0953 |
| 2019/0061759 A1* | 2/2019 | Tomishima | G08G 1/09 |

* cited by examiner

WAVEFORM ESTIMATING DEVICE, WAVEFORM ESTIMATING METHOD, AND WAVEFORM ESTIMATING PROGRAM

CROSS-REFERENCE TO RELATED APPLICATION

This application is based upon and claims the benefit of priority of the prior Japanese Patent Application No. 2017-87364, filed on Apr. 26, 2017, the entire contents of which are incorporated herein by reference.

FIELD

The embodiments discussed herein are related to a waveform estimating device, a waveform estimating method, and a waveform estimating program.

BACKGROUND

There are devices and systems that assist safe driving by detecting and feeding back dangerous swaying behavior during driving, the dangerous swaying behavior occurring due to a decrease in concentration on driving. For example, there is a technology which classifies a waveform based on temporal changes in steering angle and lateral displacement into a high-frequency component and a low-frequency component, and determines that there is a low arousal state when a power ratio obtained by dividing the low-frequency component by the high-frequency component is high.

Examples of the related art include Japanese Laid-open Patent Publication No. 2000-185575.

However, the above-described technology may take time to perform waveform signal processing. For example, the above-described technology may need accumulation of displacement amount data for a long time of approximately 50 to 80 seconds to estimate a degree of arousal with high accuracy, and thus take time to perform the signal processing for the waveform classification.

SUMMARY

In one aspect, a waveform estimating method performed by a computer, the waveform estimating method includes: estimating a first vibration component of less than a first frequency in a period from a present time to a time preceding by a half wavelength of the first frequency, using an input waveform in the period, the input waveform corresponding to a driving trajectory of a vehicle traveling on a roadway; and calculating a second vibration component of the first frequency or higher in the period by subtracting the first vibration component from the input waveform.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a waveform estimating device, a waveform estimating method, and a waveform estimating program disclosed in the present application will hereinafter be described in detail with reference to the drawings. It is to be noted that the present technology is not limited by the embodiments.

First Embodiment

[Entire Configuration]

Figure 1:
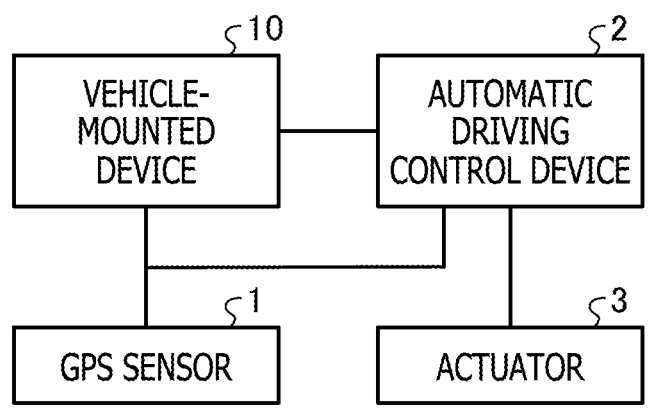
FIG. 1 is a functional block diagram illustrating a functional configuration of a driving control system according to a first embodiment.

FIG. 1 is a functional block diagram illustrating a functional configuration of a driving control system according to a first embodiment. As illustrated in FIG. 1, the driving control system includes a GPS sensor 1, a vehicle-mounted device 10, an automatic driving control device 2, and an actuator 3. The driving control system is, for example, mounted in a vehicle.

The global positioning system (GPS) sensor 1 is a sensor mounted in the vehicle. The GPS sensor 1 obtains positional information of the vehicle. The GPS sensor 1 outputs the obtained positional information to the vehicle-mounted device 10 and the automatic driving control device 2.

The vehicle-mounted device 10 is a computer mounted in the vehicle. The vehicle-mounted device 10 obtains the positional information from the GPS sensor 1, and generates the driving trajectory of the vehicle and the like. The vehicle-mounted device 10 may also generate the driving trajectory of the vehicle by a publicly known method such as white line detection processing. The vehicle-mounted device 10 may also obtain vehicle operation information or the like used to generate the driving trajectory by various publicly known methods, the GPS sensor 1, and the like.

In addition, the vehicle-mounted device 10 evaluates the operation of a driver based on the driving trajectory and the operation information of the vehicle. The vehicle-mounted device 10, for example, separates the waveform of the driving trajectory into three kinds of component waveforms in a long cycle in which a magnitude of unconscious steering appears, a medium cycle in which a magnitude of conscious steering appears, and a short cycle in which a magnitude of sudden steering appears. At this time, the vehicle-mounted device 10 may separate the waveform of the driving trajectory into each component waveform up to a present time by estimating each component waveform from a time preceding by a half wavelength of each cycle to the present time. The vehicle-mounted device 10 may therefore shorten a time taken to perform processing (signal processing) of separating the waveform into each component waveform.

Next, the vehicle-mounted device 10 evaluates overall swaying and abrupt steering from the feature quantity of each waveform. The vehicle-mounted device 10 may separate the waveform of the driving trajectory into each component waveform up to the present time, and may therefore perform each evaluation in real time. The vehicle-mounted device 10 then calculates a risk of unsteadiness from an evaluation result in real time, and determines that there is dangerous unsteadiness when a threshold value is exceeded. The vehicle-mounted device 10 may therefore shorten a time taken to detect dangerous unsteadiness of the vehicle.

Figure 2:
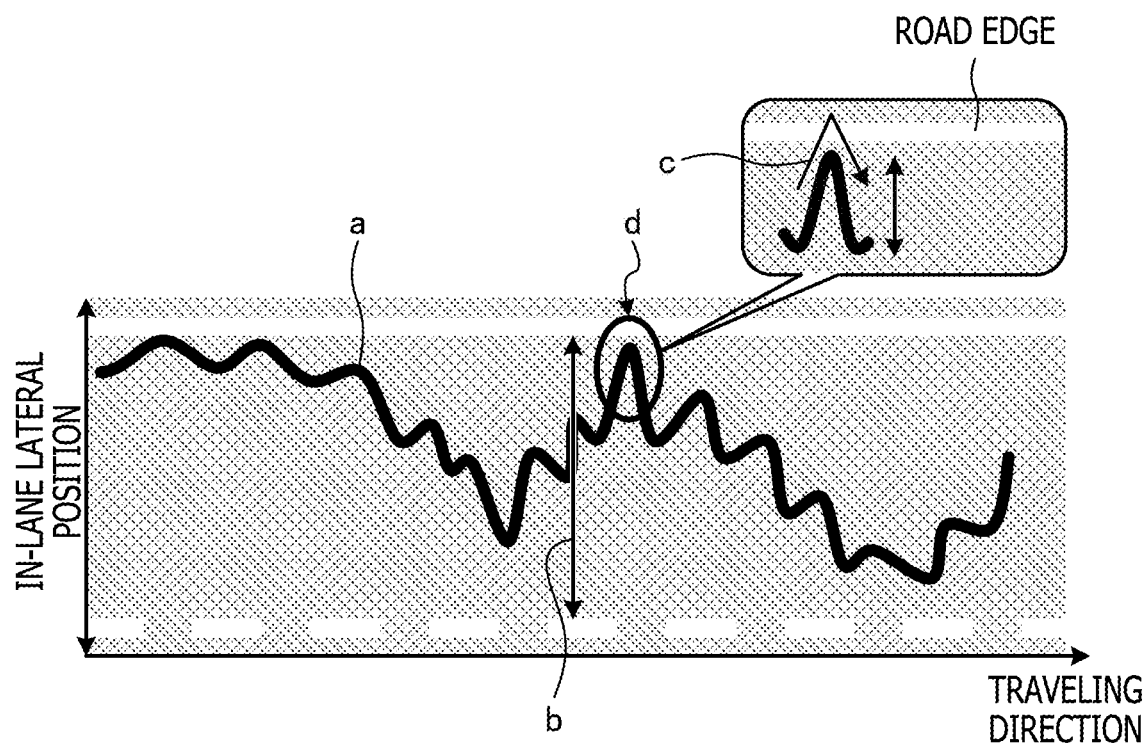
FIG. 2 is a diagram of assistance in explaining a driving trajectory of a vehicle.

Relation between the driving trajectory and detection points will be described in the following. FIG. 2 is a diagram of assistance in explaining a driving trajectory of a vehicle. As illustrated in FIG. 2, the vehicle travels in a lane between a broken line as a white line and a solid line as a white line. When the vehicle travels off the broken line or the solid line, a risk of, for example, collision with another vehicle traveling in another lane arises.

In a driving trajectory a illustrated in FIG. 2, for example, dangerous unsteadiness is a state in which overall swaying (b in FIG. 2) is increased and an abrupt steering trajectory (c in FIG. 2) occurs at a road edge (d in FIG. 2) and at a swaying edge. Here, an increase in the overall swaying represents a decrease in lane maintaining concentration, the abrupt steering trajectory represents sudden response to a delay in reaction, and abrupt steering at the road edge represents steering timing of avoiding deviation. The vehicle-mounted device 10 determines a risk by evaluating the above. The vehicle-mounted device 10 outputs a determination result to the automatic driving control device 2.

The automatic driving control device 2 is a computer mounted in the vehicle. The automatic driving control device 2 controls automatic driving of the vehicle. When the vehicle-mounted device 10 determines that there is dangerous unsteadiness, for example, the automatic driving control device 2 switches the driving mode of the vehicle from a manual driving mode in which a driver performs manual driving to an automatic driving mode in which the vehicle is automatically driven. The automatic driving control device 2 may also change the driving mode according to an instruction from the driver, for example. After switching to the automatic driving mode, the automatic driving control device 2 controls a steering angle and a vehicle speed by controlling the actuator 3 based on the positional information from the GPS sensor 1 and the like, and thereby performs automatic driving control so that the vehicle is driven automatically. The automatic driving control device 2 may also perform automatic driving control of the vehicle by a publicly known method such as white line detection processing.

The actuator 3, for example, includes an accelerator actuator, a brake actuator, and a steering actuator. The accelerator actuator adjusts the degree of opening of a throttle valve of an engine. The accelerator actuator adjusts the degree of opening of the throttle valve according to an instruction from the automatic driving control device 2. The brake actuator controls rotation of a disk, a drum, or the like rotating together with each wheel by applying a hydraulic pressure to each of wheel cylinders of the respective wheels. The brake actuator adjusts the hydraulic pressure according to an instruction from the automatic driving control device 2. The steering actuator applies a steering torque to a steering mechanism. The steering actuator adjusts the steering torque according to an instruction from the automatic driving control device 2.

[Functional Configuration]

Figure 3:
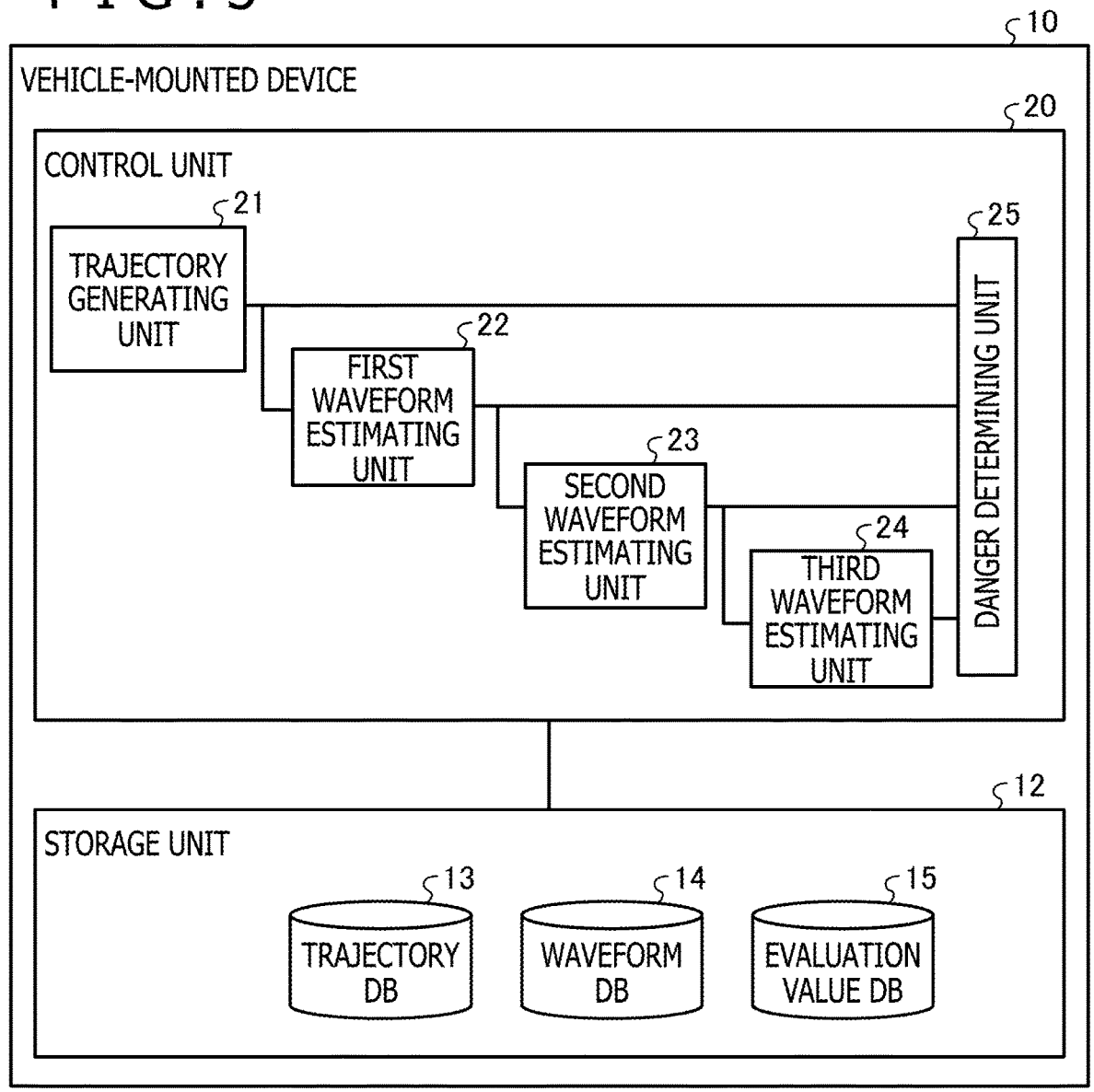
FIG. 3 is a functional block diagram illustrating a functional configuration of a vehicle-mounted device according to the first embodiment.

FIG. 3 is a functional block diagram illustrating a functional configuration of a vehicle-mounted device according to the first embodiment. The vehicle-mounted device depicted in FIG. 3 may be the vehicle-mounted device 10 depicted in FIG. 1. Incidentally, the automatic driving control device 2 is a computer that performs automatic driving of the vehicle, and has functions similar to those of an ordinary automatic driving control device. Therefore detailed description of the automatic driving control device 2 will be omitted here.

As illustrated in FIG. 3, the vehicle-mounted device 10 includes a storage unit 12 and a control unit 20. The storage unit 12 is a storage device storing a program, data, and the like. The storage unit 12 is, for example, a memory, a hard disk, or the like. The storage unit 12 stores a trajectory DB 13, a waveform DB 14, and an evaluation value DB 15. The trajectory DB 13 is a database that stores the driving trajectory generated by the control unit 20, the operation information, and the like in association with a traveling time.

The waveform DB 14 stores respective component waveforms (vibration components) obtained by separating the waveform of the driving trajectory into a long cycle, a medium cycle, and a short cycle. The waveform DB 14 is a database that stores the respective component waveforms generated by the control unit 20 in association with the traveling time.

Figure 4:
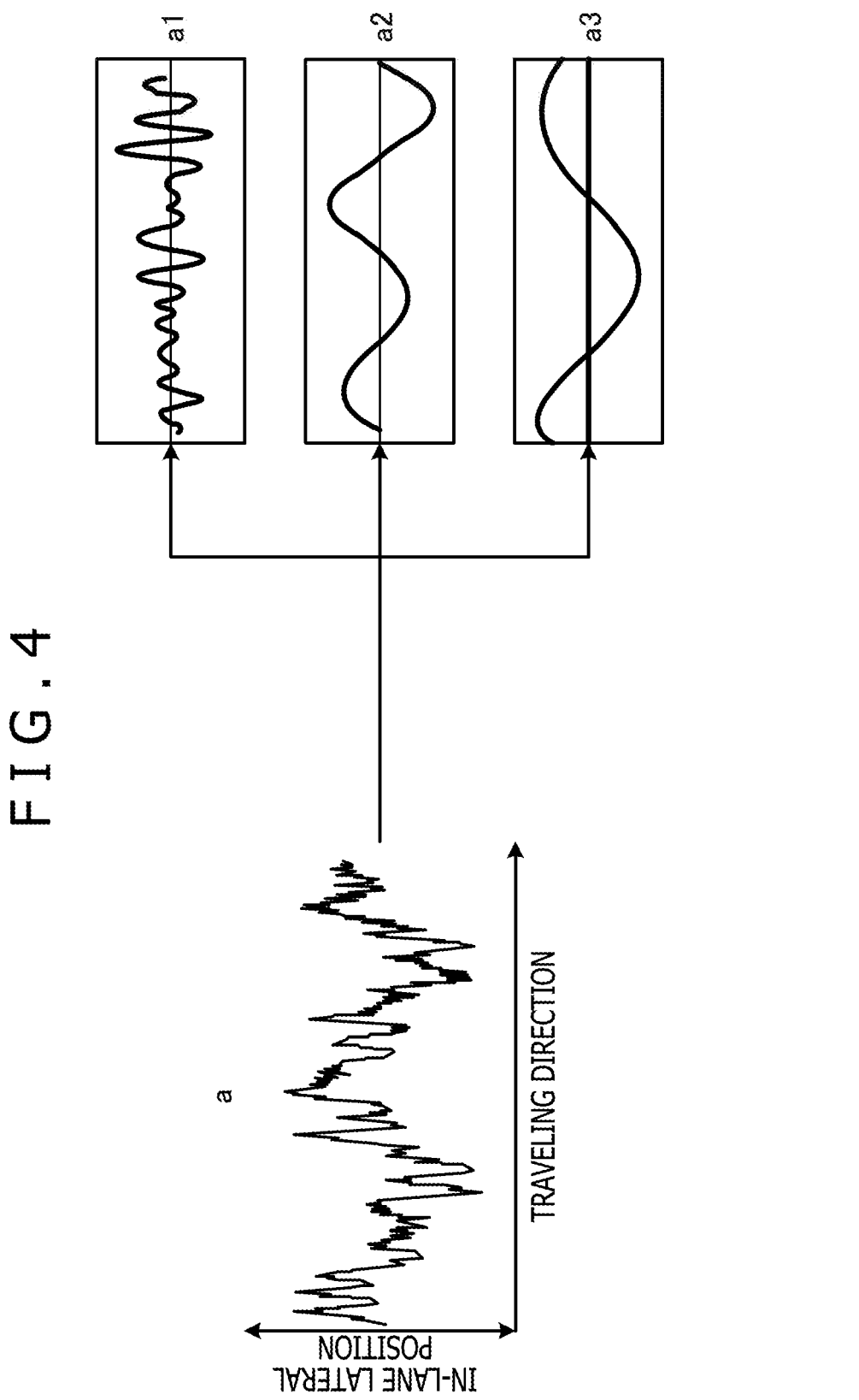
FIG. 4 is a diagram of assistance in explaining each component waveform of a driving trajectory.

The respective component waveforms obtained by separating the waveform of the driving trajectory will be described in the following. FIG. 4 is a diagram of assistance in explaining each component waveform of a driving trajectory. As illustrated in FIG. 4, the waveform a of the driving trajectory is separated into a vibration component a1 related to abrupt steering in a short cycle, a vibration component a2 related to normal steering in a medium cycle, and a vibration component a3 related to in-lane swaying in a long cycle. The cycles of the respective vibration components a1 to a3 are different at each time, but the cycles are each within a certain defined range.

For example, a periodic waveform of 1 to 4 seconds is included in the short cycle, a periodic waveform of 8 to 16 seconds is included in the medium cycle, and a periodic waveform of 60 to 90 seconds is included in the long cycle. The cycle ranges are an example, and may not be limited to this as long as the cycle ranges do not overlap each other. As for cycle lengths at each time in the vibration components a1 to a3, for example, transformation of the waveform of the driving trajectory into a frequency domain with an extraction time as a center is performed, the transformation being typified by a discrete Fourier transform (DFT), and the cycle lengths at each time in the vibration components a1 to a3 may be determined based on response components representing the target frequency ranges. Representative response cycles (frequencies) may be determined by using frequencies (cycles) at which a maximum response is exhibited in the frequency ranges or by using statistics such as average values or median values in the frequency ranges.

The description returns to FIG. 3. The evaluation value DB 15 is a database that stores a risk evaluation result. For example, the evaluation value DB 15 stores an evaluation value in association with a traveling time. Here, the evaluation value is evaluated according to the driving trajectory, and the high the numerical value is, the higher the driving risk indicated is.

The control unit 20 is a processing unit that controls the whole of the vehicle-mounted device 10. The control unit 20 is, for example, a processor. The control unit 20 includes a trajectory generating unit 21, a first waveform estimating unit 22, a second waveform estimating unit 23, a third waveform estimating unit 24, and a danger determining unit 25. Incidentally, the trajectory generating unit 21, the first waveform estimating unit 22, the second waveform estimating unit 23, the third waveform estimating unit 24, and the danger determining unit 25 are an example of an electronic circuit such as a processor or an example of a process executed by the processor.

The trajectory generating unit 21 is a processing unit that generates the driving trajectory of the vehicle according to the positional information obtained from the GPS sensor 1. The trajectory generating unit 21 may also receive image information or the like during driving, the image information being imaged by a drive recorder or the like, and generate the driving trajectory of the vehicle using white line detection processing or the like. The trajectory generating unit 21 stores the generated driving trajectory in the trajectory DB 13.

The first to third waveform estimating units 22 to 24 are processing units that individually separate, from the waveform of the driving trajectory, component waveforms (vibration components a1 to a3) in a short cycle, a medium cycle, and a long cycle from a start of driving to the present time. The first waveform estimating unit 22 receives the waveform of the driving trajectory as an input waveform, and separates the input waveform into a vibration component a1 in a short cycle and another vibration component (first average waveform). In addition, the first waveform estimating unit 22 calculates the waveform power of the vibration component a1 in the short cycle. Incidentally, details of processing of the first waveform estimating unit 22 will be described later with reference to FIG. 6.

Next, the second waveform estimating unit 23 receives the first average waveform separated by the first waveform estimating unit 22 as an input waveform, and separates the input waveform into a vibration component a2 in a medium cycle and another vibration component (second average waveform). In addition, the second waveform estimating unit 23 calculates the waveform power of the vibration component a2 in the medium cycle. The third waveform estimating unit 24 receives the second average waveform separated by the second waveform estimating unit 23 as an input waveform, and separates the input waveform into a vibration component a3 in a long cycle. In addition, the third waveform estimating unit 24 calculates the waveform power of the vibration component a3 in the long cycle. The first to third waveform estimating units 22 to 24 thus separate the vibration components a1 to a3 in order from a high frequency.

Figure 5:
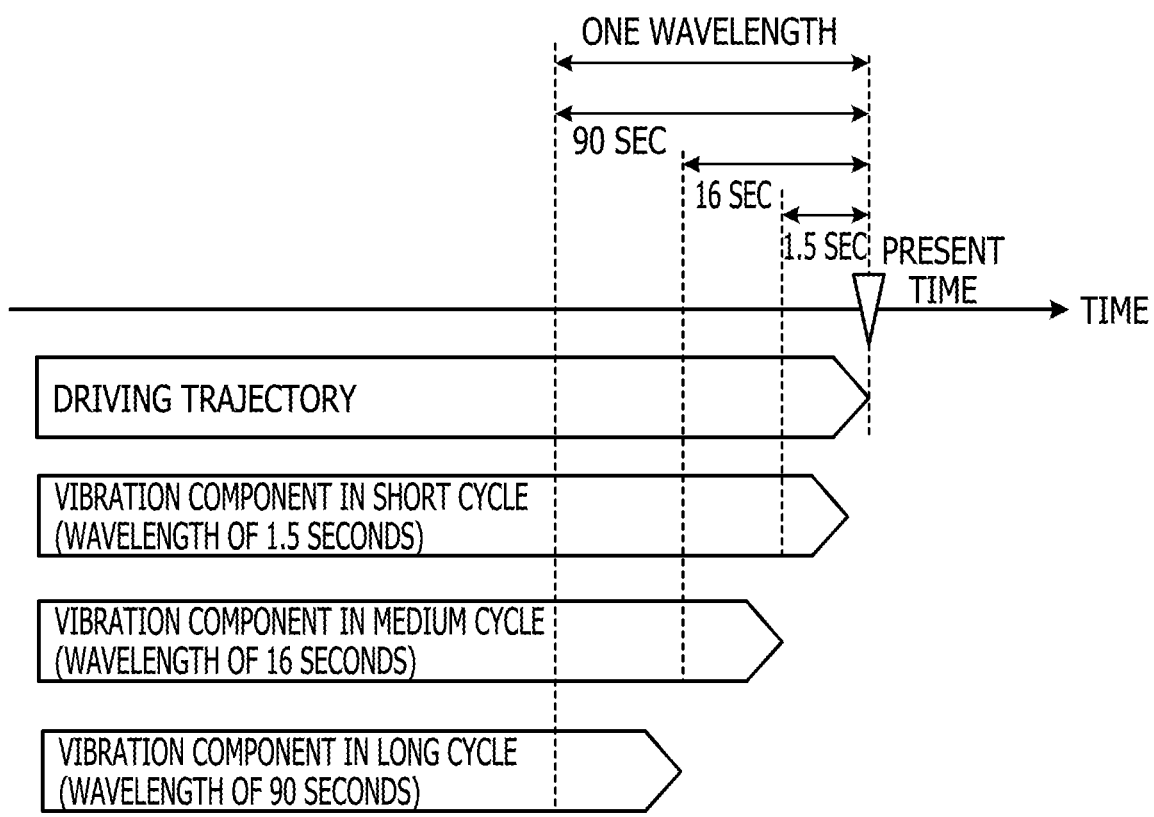
FIG. 5 is a diagram of assistance in explaining extraction times of vibration components.

Extraction times of the respective vibration components a1 to a3 will be described in the following. FIG. 5 is a diagram of assistance in explaining extraction times of vibration components. The vibration components may be the vibration components a1 to a3 depicted in FIG. 4. Incidentally, FIG. 5 schematically illustrates one wavelength of each of the vibration components a1 to a3. The first to third waveform estimating units 22 to 24 transform the input waveform of one wavelength into a frequency domain with an extraction time as a center, and separate the vibration components a1 to a3. Therefore, the first to third waveform estimating units 22 to 24 may directly separate vibration components a1 to a3 up to a time preceding the present time by a half wavelength from the waveform of the driving trajectory, but it is difficult for the first to third waveform estimating units 22 to 24 to directly separate vibration components a1 to a3 from the time preceding by the half wavelength to the present time. Therefore, in a case of a short cycle of 1.5 seconds, for example, the vibration component a1 is not separated during a period from the present time to a time preceding by 0.75 seconds. In a case of a medium cycle of 16 seconds, for example, the vibration component a2 is not separated during a period from the present time to a time preceding by 8 seconds. In addition, in a case of a long cycle of 90 seconds, for example, the vibration component a3 is not separated during a period from the present time to a time preceding by 45 seconds.

Thus, when the first to third waveform estimating units 22 to 24 directly separate the vibration components a1 to a3 from the waveform of the driving trajectory, the first to third waveform estimating units 22 to 24 may separate the vibration components a1 to a3 only after the passage of a time corresponding to a half wavelength. Hence, supposing that the danger determining unit 25 to be described later makes dangerous unsteadiness determination using the vibration components a1 to a3 directly separated by the first to third waveform estimating units 22 to 24, the determination may be made only for dangerous unsteadiness up to a time preceding the present time by 90 seconds, and it is difficult to make the determination in real time. Accordingly, in the present embodiment, the first to third waveform estimating units 22 to 24 estimate the vibration components a1 to a3 from the present time to a time preceding by a half wavelength. The separation of the vibration components in real time is thereby made possible. Thus, the danger determining unit 25 may make dangerous unsteadiness determination in real time.

Figure 6:
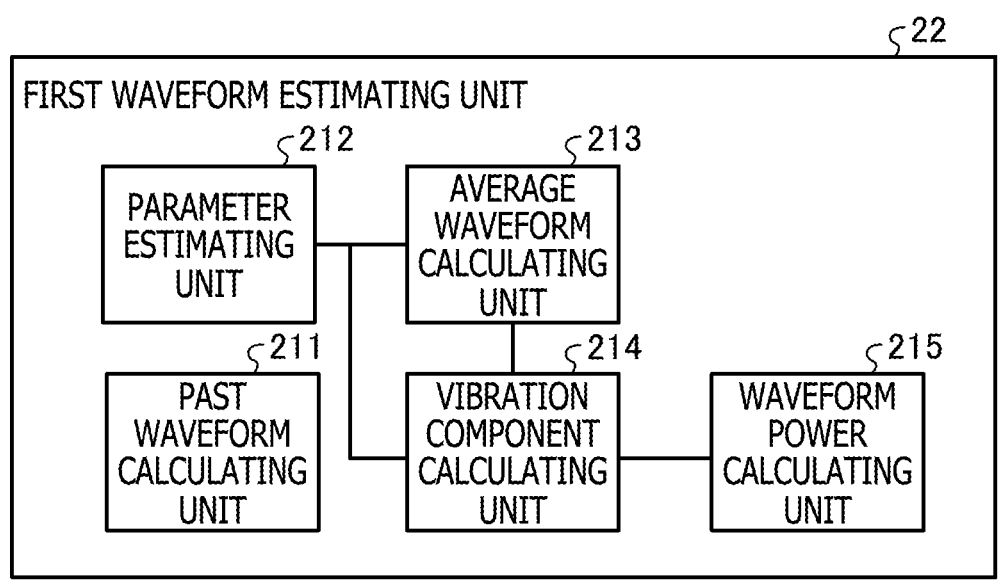
FIG. 6 is a functional block diagram illustrating a functional configuration of a first waveform estimating unit.

FIG. 6 is a functional block diagram illustrating a functional configuration of a first waveform estimating unit. The first waveform estimating unit depicted in FIG. 6 may be the first waveform estimating unit 22 in FIG. 3. Incidentally, the second and third waveform estimating units 23 and 24 perform processing similar to that of the first waveform estimating unit 22 except that the input waveforms and the cycles of the separated vibration components are different. Therefore description of the second and third waveform estimating units 23 and 24 will be omitted.

As illustrated in FIG. 6, the first waveform estimating unit 22 includes a past waveform calculating unit 211, a parameter estimating unit 212, an average waveform calculating unit 213, a vibration component calculating unit 214, and a waveform power calculating unit 215.

The past waveform calculating unit 211 is a processing unit that separates a vibration component and a first average waveform up to a time preceding the present time by a half wavelength from the input waveform (waveform of the driving trajectory). For example, the past waveform calculating unit 211 is an example of a vibration calculating unit that calculates the first average waveform up to a time preceding by the half wavelength using the input waveform up to the present time. For example, for a total of n kinds of wavelength candidates Lc={L1, L2, . . . , Ln}, the past waveform calculating unit 211 performs a Fourier transform of the input waveform with a time preceding the present time by a half wavelength as a center. Then, the past waveform calculating unit 211 determines a wavelength where the vector sizes of a sin value and a cos value of a Fourier transform coefficient are at a maximum as a wavelength at the time preceding the present time by the half wavelength.

Next, the past waveform calculating unit 211 calculates the first average waveform by averaging the input waveform in a range of the determined wavelength. The past waveform calculating unit 211 calculates a vibration component by subtracting the calculated first average waveform from the input waveform from the present time to the time preceding by the half wavelength. In addition, for the vibration component with a time preceding the present time by one wavelength as a center, the past waveform calculating unit 211 calculates a root mean square (RMS) value as waveform power in a wavelength range determined by the time. The past waveform calculating unit 211 stores the determined wavelength, the separated vibration component and the first average waveform, and the waveform power in the waveform DB 14.

Figure 7:
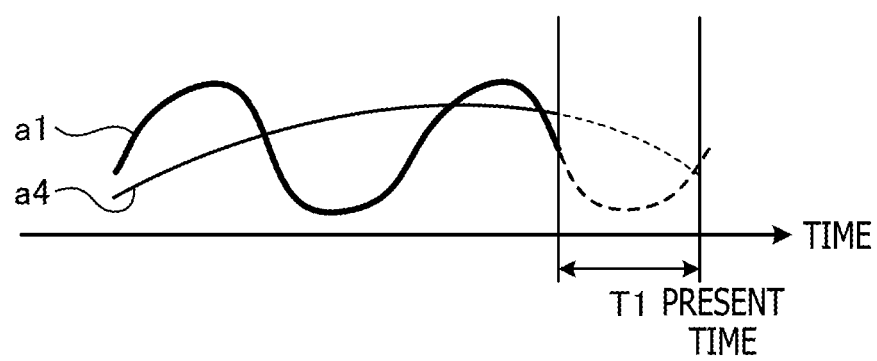
FIG. 7 is a diagram of assistance in explaining estimation of a first average waveform.

The parameter estimating unit 212 is a processing unit that estimates each parameter of a polynomial representing the first average waveform. Here, description will be made of reasons that the parameter estimating unit 212 estimates the parameters of the first average waveform. FIG. 7 is a diagram of assistance in explaining estimation of a first average waveform. A vibration component a1 illustrated in FIG. 7 has a cycle approximately four times shorter than that of a first average waveform a4. Therefore, the first average waveform a4 in a period (period T1) from the present time to the time preceding by the half wavelength of the short cycle is approximately ⅛ of the wavelength, and the vibration component a1 in the period is approximately a half wavelength. Hence, the first average waveform a4 in the period T1 may be modeled by a polynomial that monotonically increases or monotonically decreases, and may be modeled by a polynomial (quadratic polynomial) of lower order than a polynomial representing the vibration component a1, as represented in Equation (1).

$$y_t = \alpha \cdot t^2 + \beta \cdot t + \gamma \quad (1)$$

Incidentally, $y_t$ in Equation (1) is the first average waveform at time t, and $\alpha$, $\beta$, and $\gamma$ are each a parameter. In addition, the time preceding the present time by the half wavelength is set as a reference (t=0). Hence, the present time is a time of one half of a short cycle Ts (t=Ts/2). The parameter $\gamma$ is the first average waveform $y_0$ at time t=0, and is calculated based on Equation (2). Incidentally, the first average waveform $y_0$ at time t=0 is obtained from a first average waveform $q_t$ calculated by the past waveform calculating unit 211 ($y_0 = q_0$).

$$y_0 = \alpha \cdot 0^2 + \beta \cdot 0 + \gamma = \gamma \quad (2)$$

The parameter estimating unit 212 calculates the respective parameters $\alpha$ and $\beta$ in Equation (1) so as to minimize a difference between the first average waveform $y_t$ and an input waveform $p_t$ in the period T1. In addition, the parameter estimating unit 212 calculates the parameters $\alpha$ and $\beta$ so as to minimize a difference between the first average waveform $y_t$ and the first average waveform $q_t$ calculated by the past waveform calculating unit 211 in a period T2 from reference time t=0 to a time preceding by a half wavelength. For example, as illustrated in Equation (3), the parameter estimating unit 212 calculates a difference between the first average waveform $y_t$ and a waveform $m_t$. Incidentally, as illustrated in Equation (4), the waveform $m_t$ is a waveform that becomes the input waveform $p_t$ when t≥0, and becomes the first average waveform $q_t$ calculated by the past waveform calculating unit 211 when t<0.

$$s_t = (y_t - m_t) = (\alpha \cdot t^2 + \beta \cdot t + y_0 - m_t) \quad (3)$$

$$m_t = \begin{cases} p_t (t \geq 0) \\ q_t (t < 0) \end{cases} \quad (4)$$

Next, the parameter estimating unit 212 calculates a square residual sum S of a residual $s_t$ based on Equation (5), and calculates the parameters $\alpha$ and $\beta$ as illustrated in Equation (8) by solving Equation (6) and Equation (7) so as to minimize the square residual sum S.

$$S = (1/2) \sum s_t^2 = (1/2) \sum (\alpha \cdot t^2 + \beta \cdot t + y_0 - m_t)^2 \quad (5)$$

$$dS/da = \sum ((\alpha \cdot t^2 + \beta \cdot t + y_0 - m_t) \cdot t^2) = \alpha \sum t^4 + \beta \sum t^3 + \sum (y_0 - m_t) t^2 = 0 \quad (6)$$

$$dS/db = \sum ((\alpha \cdot t^2 + \beta \cdot t + y_0 - m_t) \cdot t) = \alpha \sum t^3 + \beta \sum t^2 + \sum (y_0 - m_t) t = 0 \quad (7)$$

$$\begin{pmatrix} \alpha \\ \beta \end{pmatrix} = \begin{pmatrix} \sum t^4 & \sum t^3 \\ \sum t^3 & \sum t^2 \end{pmatrix}^{-1} \begin{pmatrix} -\sum (y_0 - m_t) t^2 \\ -\sum (y_0 - m_t) t \end{pmatrix} \quad (8)$$

Figure 8:
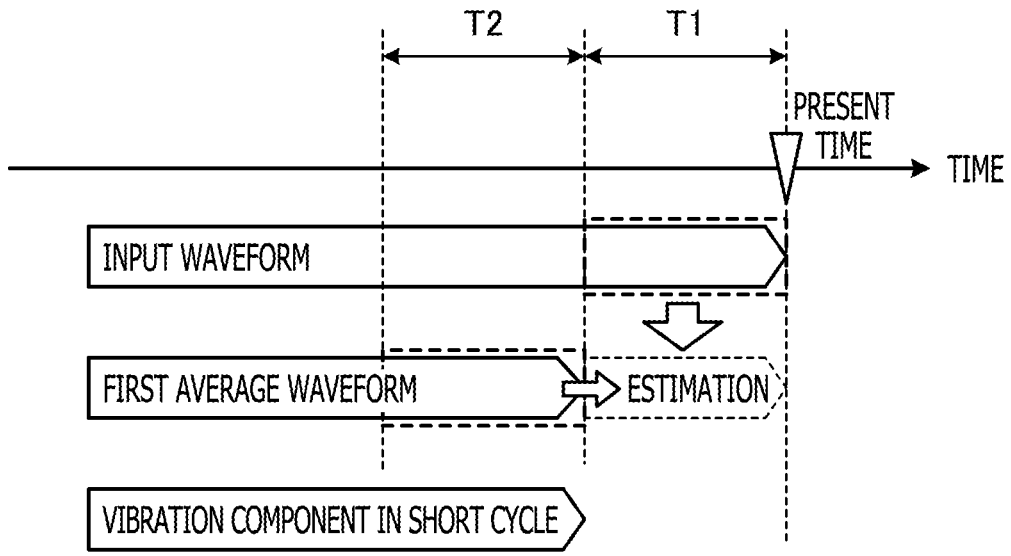
FIG. 8 is a diagram of assistance in explaining estimation of a first average waveform.

FIG. 8 is a diagram of assistance in explaining estimation of a first average waveform. As illustrated in FIG. 8, the parameter estimating unit 212 estimates the first average waveform $y_t$ in the period T1 using the first average waveform $q_t$ in the period T2 in addition to the input waveform $p_t$ in the period T1. The first average waveform $y_t$ may be thereby estimated with higher accuracy. Thus, the parameter estimating unit 212 is an example of a coefficient calculating unit that calculates the coefficients of a polynomial model minimizing the differences between the first average waveform $y_t$ in the period T1 and the input waveform $p_t$ in the period T1 and the first average waveform $q_t$ in the period T2.

Returning to FIG. 6, the parameter estimating unit 212 outputs the calculated parameters $\alpha$ to $\gamma$ to the average waveform calculating unit 213.

The average waveform calculating unit 213 is a processing unit that calculates the first average waveform $y_t$ in the period T1 based on the parameters $\alpha$ to $\gamma$ calculated by the parameter estimating unit 212. For example, the average waveform calculating unit 213 is an example of an estimating unit that estimates the first average waveform $y_t$ in the period T1 using the input waveform $p_t$ in the period T1. In addition, the average waveform calculating unit 213 outputs, to the second waveform estimating unit 23, the first average waveform $q_t$ before the period T1 and the first average waveform $y_t$ in the period T1 as a first average waveform up to the present time. The first average waveform up to the present time is the input waveform of the second waveform estimating unit 23. In addition, the average waveform calculating unit 213 outputs the first average waveform $y_t$ in the period T1 to the vibration component calculating unit 214.

Figure 9:
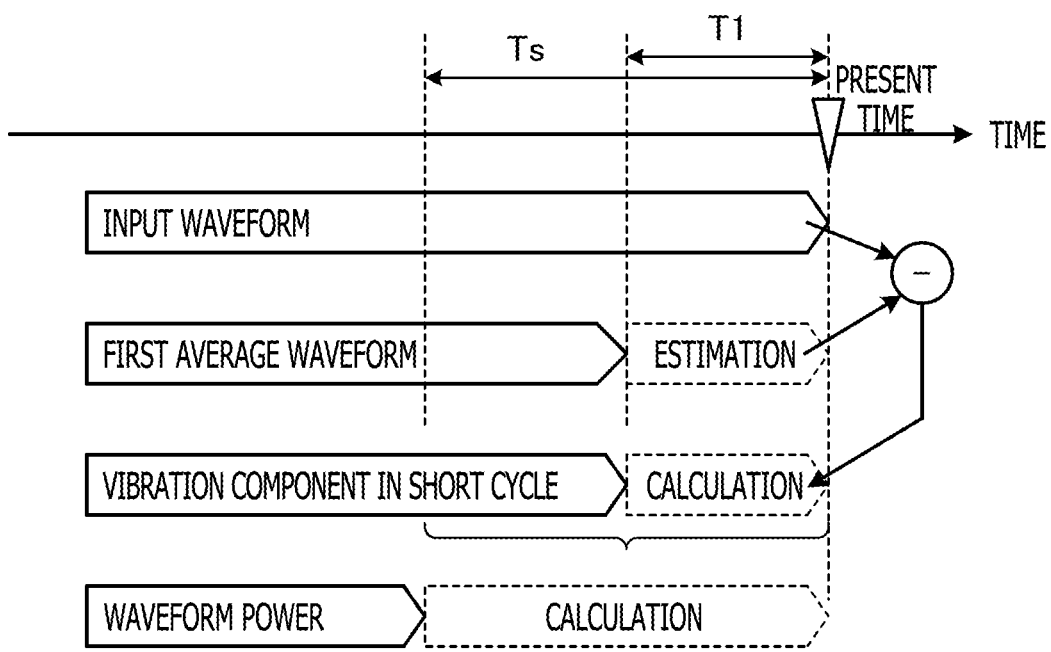
FIG. 9 is a diagram of assistance in explaining calculation of a vibration component in a short cycle.

The vibration component calculating unit 214 is a processing unit that calculates a vibration component in a short cycle Ts based on the first average waveform $y_t$ obtained from the average waveform calculating unit 213. For example, the vibration component calculating unit 214 is an example of a calculating unit that calculates the vibration component in the short cycle Ts in the period T1 based on the first average waveform $y_t$. FIG. 9 is a diagram of assistance in explaining calculation of a vibration component in a short cycle. As illustrated in FIG. 9, the vibration component calculating unit 214 calculates the vibration component in the period T1 by subtracting the first average waveform $y_t$ estimated by the average waveform calculating unit 213 from the input waveform $p_t$. For example, the vibration component calculating unit 214 calculates a vibration component $r_t$ in the period T1 based on Equation (9).

$$r_t = p_t - y_t = p_t - (\alpha \cdot t^2 + \beta \cdot t + \gamma) \tag{9}$$

The vibration component calculating unit 214 outputs the calculated vibration component $r_t$ to the danger determining unit 25 and the waveform power calculating unit 215.

The waveform power calculating unit 215 is a processing unit that calculates waveform power from the vibration component $r_t$. The waveform power calculating unit 215, for example, calculates the RMS value of the vibration component $r_t$ from the present time to a time preceding by one wavelength as the waveform power (see FIG. 9). The waveform power calculating unit 215 outputs the calculated waveform power to the danger determining unit 25.

Figure 10:
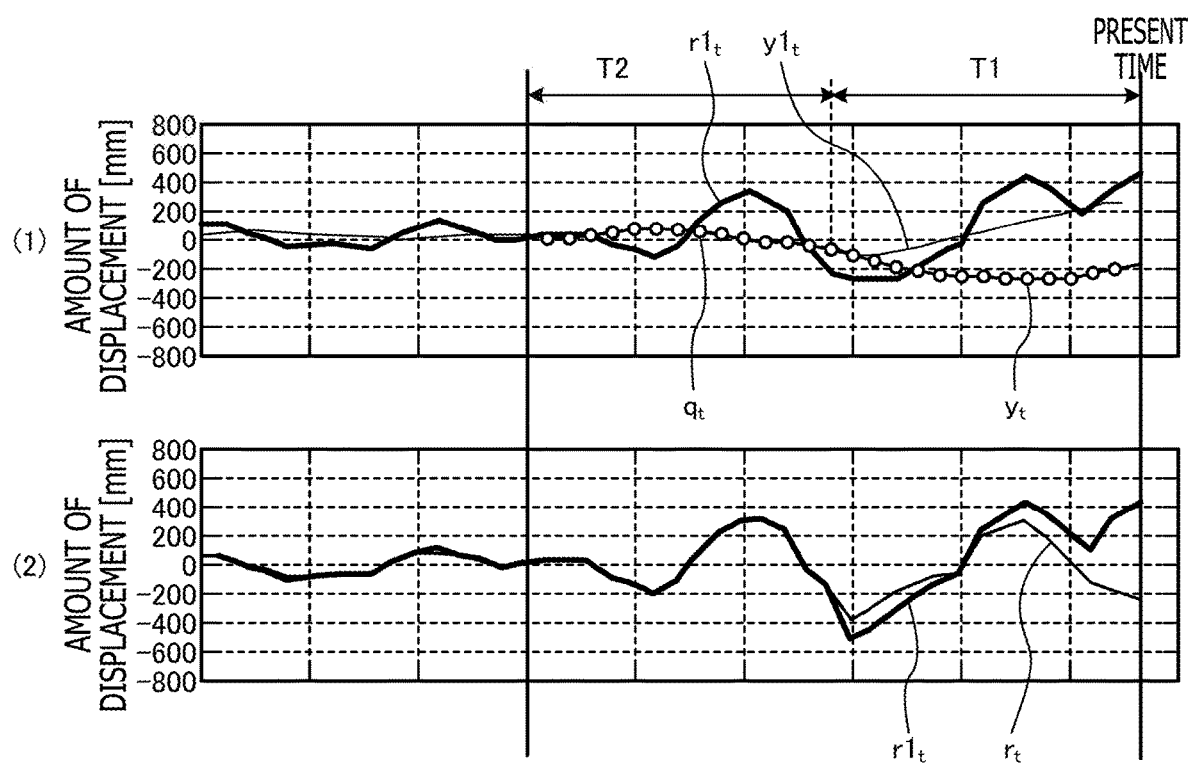
FIG. 10 is a diagram illustrating an example of a simulation result of estimation of a first average waveform.
Figure 11:
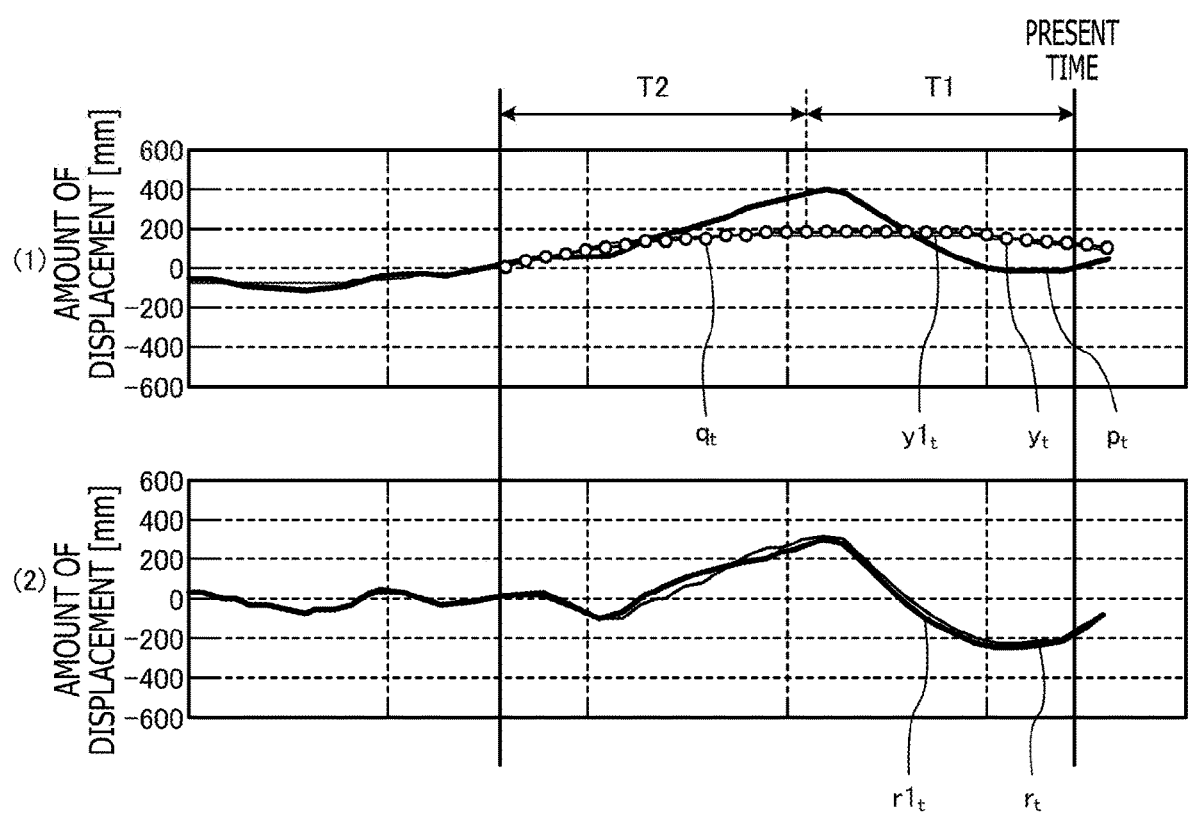
FIG. 11 is a diagram illustrating an example of a simulation result of estimation of a first average waveform.

FIG. 10 and FIG. 11 are diagrams illustrating an example of simulation results of estimation of a first average waveform. FIG. 10 illustrates an estimation result in a case where the first average waveform $y_t$ in the period T1 is estimated using the first average waveform $q_t$ calculated by the past waveform calculating unit 211. FIG. 11 illustrates an estimation result in a case where the first average waveform $y_t$ in the period T1 is estimated using the first average waveform $q_t$ calculated by the past waveform calculating unit 211 and the input waveform $p_t$. (1) in FIG. 10 and (1) in FIG. 11 illustrate the estimated first average waveforms $y_t$ and actual first average waveforms $y1_t$. In addition, (2) in FIG. 10 and (2) in FIG. 11 illustrate the vibration components $r_t$ calculated based on the calculated first average waveforms $y_t$ and actual vibration components $q_t$.

As illustrated in (1) in FIG. 10, in the case where the first average waveform $y_t$ in the period T1 is estimated using the first average waveform $q_t$, the estimated first average waveform $y_t$ and the actual first average waveform $y1_t$ are different from each other. Therefore, as illustrated in (2) in FIG. 10, the calculated vibration component $r_t$ and the actual vibration component $r1_t$ are different from each other. This is because the tendency of the vibration component $r_t$ in the period T1 is different from the vibration component $r_t$ before the period T1. Thus, when the tendency of the vibration component $r_t$ changes, an error included in the calculated vibration component $r_t$ is increased.

On the other hand, as illustrated in (1) in FIG. 11, in the case where the first average waveform $y_t$ in the period T1 is estimated using the first average waveform $q_t$ and the input waveform $p_t$, the first waveform estimating unit 22 may estimate the first average waveform $y_t$ that is substantially the same waveform as the actual first average waveform $y1_t$. Therefore, as illustrated in (2) in FIG. 11, the first waveform estimating unit 22 may calculate the vibration component $r_t$ having substantially the same waveform as the actual vibration component $r1_t$. By thus calculating the vibration component $r_t$ using the first average waveform $q_t$, it is possible to calculate the vibration component $r_t$ corresponding to the tendency of the vibration component $r_t$ before the period T1, and reduce an error included in the vibration component $r_t$.

Incidentally, as with the first waveform estimating unit 22, the second and third waveform estimating units 23 and 24 include the past waveform calculating unit 211, the parameter estimating unit 212, the average waveform calculating unit 213, the vibration component calculating unit 214, and the waveform power calculating unit 215. For example, the average waveform calculating unit 213 of the second waveform estimating unit 23 operates as a second estimating unit that receives, as an input waveform, the first average waveform $y_t$ from the present time to a time preceding by the half wavelength of a medium cycle, and estimates a second average waveform in the medium cycle in a second period. In addition, for example, the vibration component calculating unit 214 of the second waveform estimating unit 23 operates as a second calculating unit that calculates a vibration component in the medium cycle by subtracting the second average waveform from the first average waveform $y_t$.

Figure 12:
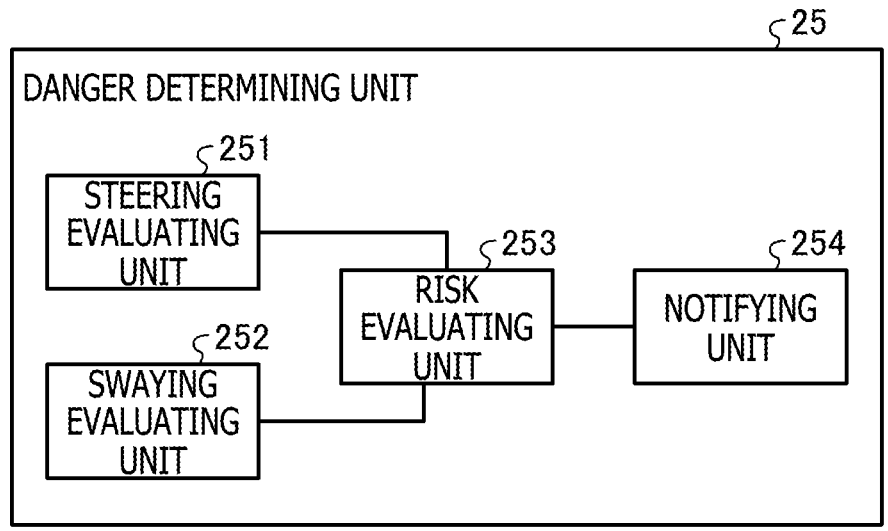
FIG. 12 is a functional block diagram illustrating a functional configuration of a danger determining unit.

FIG. 12 is a functional block diagram illustrating a functional configuration of a danger determining unit. The danger determining unit depicted in FIG. 12 may be the danger determining unit 25 depicted in FIG. 3. The danger determining unit 25 is an example of a determining unit that determines a risk related to driving of the vehicle based on the feature quantities of the vibration components in the respective cycles, for example. The danger determining unit 25 includes a steering evaluating unit 251, a swaying evaluating unit 252, a risk evaluating unit 253, and a notifying unit 254.

The steering evaluating unit 251 is a processing unit that evaluates driving operation based on a state in which abrupt steering occurs in relation to driving and steering of the driver. The steering evaluating unit 251 obtains waveform power in the short cycle Ts from the first waveform estimating unit 22. In addition, the steering evaluating unit 251 obtains the waveform value (amplitude value) of the vibration component in the medium cycle. Then, the steering evaluating unit 251 calculates an abrupt steering score value based on the obtained waveform power and the obtained waveform value, and outputs the calculated abrupt steering score value to the risk evaluating unit 253.

For example, the steering evaluating unit 251 first calculates an abrupt steering waveform power score value s1 using an evaluation function f1(x). For example, letting p1 be the waveform power in the short cycle Ts, the steering evaluating unit 251 calculates s1=f1(p1). Incidentally, the evaluation function f1(x) is a function that linearly converts the waveform power into a score value, as illustrated in Equation (10), or nonlinearly converts the waveform power into a score value, as illustrated in Equation (11). Incidentally, α1 and β1 in Equation (10) are constants, and are set for each type of waveform power to be converted into a score value.

$$f1(x) = \alpha 1 x + \beta 1 \tag{10}$$

$$f1(x) = (\tan h(x/2) + 1)/2 \tag{11}$$

In addition, the steering evaluating unit 251 calculates a normal steering swaying rate tv using the waveform value of the vibration component in the medium cycle (normal steering swaying waveform value) w2. For example, as illustrated in Equation (12), the smaller of a value obtained by dividing the absolute value of the waveform value w2 by a threshold value distance base and a lower limit value is set as the normal steering swaying rate tv. Incidentally, the threshold value distance base is a value set in advance, and is, for example, 200 mm. In addition, the lower limit value in Equation (12) is "1." Next, the steering evaluating unit 251 calculates an abrupt steering score value sc1=s1*tv by multiplying together the abrupt steering waveform power score value s1 and the normal steering swaying rate tv.

$$tv = \text{MIN}(|W2|/\text{base}, 1) \qquad (12)$$

The swaying evaluating unit 252 is a processing unit that evaluates the magnitude of overall swaying of the driving trajectory in relation to driving and steering of the driver. The swaying evaluating unit 252 calculates an overall swaying score value based on waveform power in the medium cycle and waveform power in the long cycle, which are obtained from the second and third waveform estimating units 23 and 24, and outputs the calculated overall swaying score value to the risk evaluating unit 253.

For example, the swaying evaluating unit 252 first calculates a normal steering waveform power score value S2 and an in-lane swaying waveform power score value S3 using the evaluation function f1(x). For example, letting p2 be the waveform power in the medium cycle, and letting p3 be the waveform power in the long cycle, the swaying evaluating unit 252 calculates S2=f1(p2) and S3=f1(p3). Next, the swaying evaluating unit 252 calculates a power score rise rate g using Equation (13).

$$g = ((2\sqrt{S2 \cdot S3})/(S2+S3))^2 \qquad (13)$$

Then, the swaying evaluating unit 252 calculates an overall swaying score value sc2=(S2+S3)*g by multiplying a result of addition of the normal steering waveform power score value S2 and the in-lane swaying waveform power score value S3 by the power score rise rate g.

The risk evaluating unit 253 is a processing unit that evaluates a risk of driving of the driver based on the evaluation result of the steering evaluating unit 251 and the evaluation result of the swaying evaluating unit 252. For example, first, a lateral displacement m1 when the vehicle is traveling is obtained from the driving trajectory. Next, the risk evaluating unit 253 calculates a lateral displacement danger score value cr using an evaluation function f2(x). For example, the risk evaluating unit 253 calculates cr=f2(m1). Incidentally, the evaluation function f2(x) is the same function as the evaluation function f1(x) as illustrated in Equation (14) in a case where nonlinear transformation is performed, or the evaluation function f2(x) is a linear function illustrated in Equation (15) in a case where linear transformation is performed. Incidentally, $\alpha 2$ and $\beta 2$ in Equation (15) are constants.

$$f2(x) = f1(x) \qquad (14)$$

$$f2(x) = \alpha 2 x + \beta 2 \qquad (15)$$

Next, the risk evaluating unit 253 calculates a risk score value sc3=(sc1+sc2)*cr by multiplying a result of addition of the abrupt steering score value sc1 and the overall swaying score value sc2 by the lateral displacement danger score value cr.

The risk evaluating unit 253 then outputs the calculated risk score value sc3 to the notifying unit 254. In addition, the risk evaluating unit 253 stores the time of the target driving trajectory and the risk score value sc3 in the evaluation value DB 15 in association with each other. Incidentally, the risk evaluating unit 253 may store the abrupt steering score value sc1 and the overall swaying score value sc2 in the evaluation value DB 15 in addition to the risk score value sc3.

The notifying unit 254 is a processing unit that determines that the risk score value sc3 indicates a high risk when the risk score value sc3 exceeds a certain value, and notifies the automatic driving control device 2. For example, when the risk score value sc3 obtained from the risk evaluating unit 253 exceeds the certain value, the notifying unit 254 notifies the automatic driving control device 2 that dangerous unsteadiness has occurred. When the automatic driving control device 2 is notified from the notifying unit 254, the automatic driving control device 2 switches to the automatic driving mode. The notifying unit 254 may also notify the driver of danger by displaying a message indicating the occurrence of dangerous unsteadiness on a display or the like or notifying the occurrence of dangerous unsteadiness by sound.

[Flow of Processing]

Figure 13:
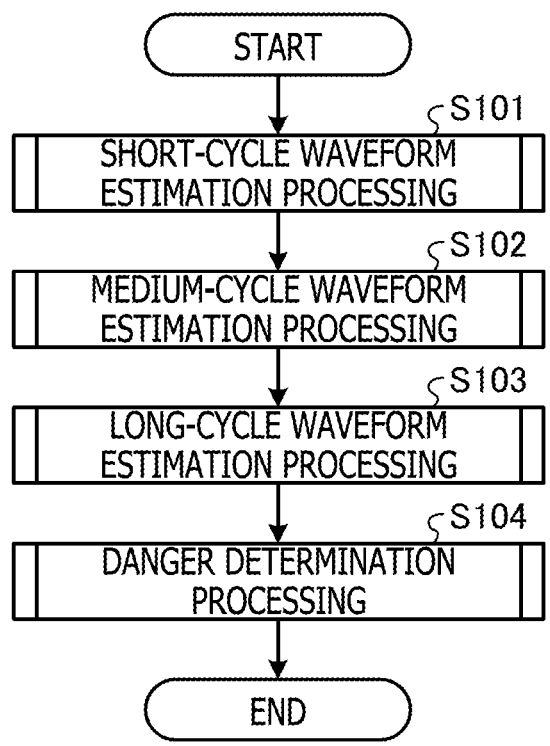
FIG. 13 is a flowchart illustrating a flow of processing.

FIG. 13 is a flowchart illustrating a flow of processing. As illustrated in FIG. 13, the first waveform estimating unit 22 performs short-cycle waveform estimation processing (S101). The second waveform estimating unit 23 performs medium-cycle waveform estimation processing (S102). Next, the third waveform estimating unit 24 performs long-cycle waveform estimation processing (S103). The danger determining unit 25 thereafter performs danger determination processing (S104). The processing is then ended.

Figure 14:
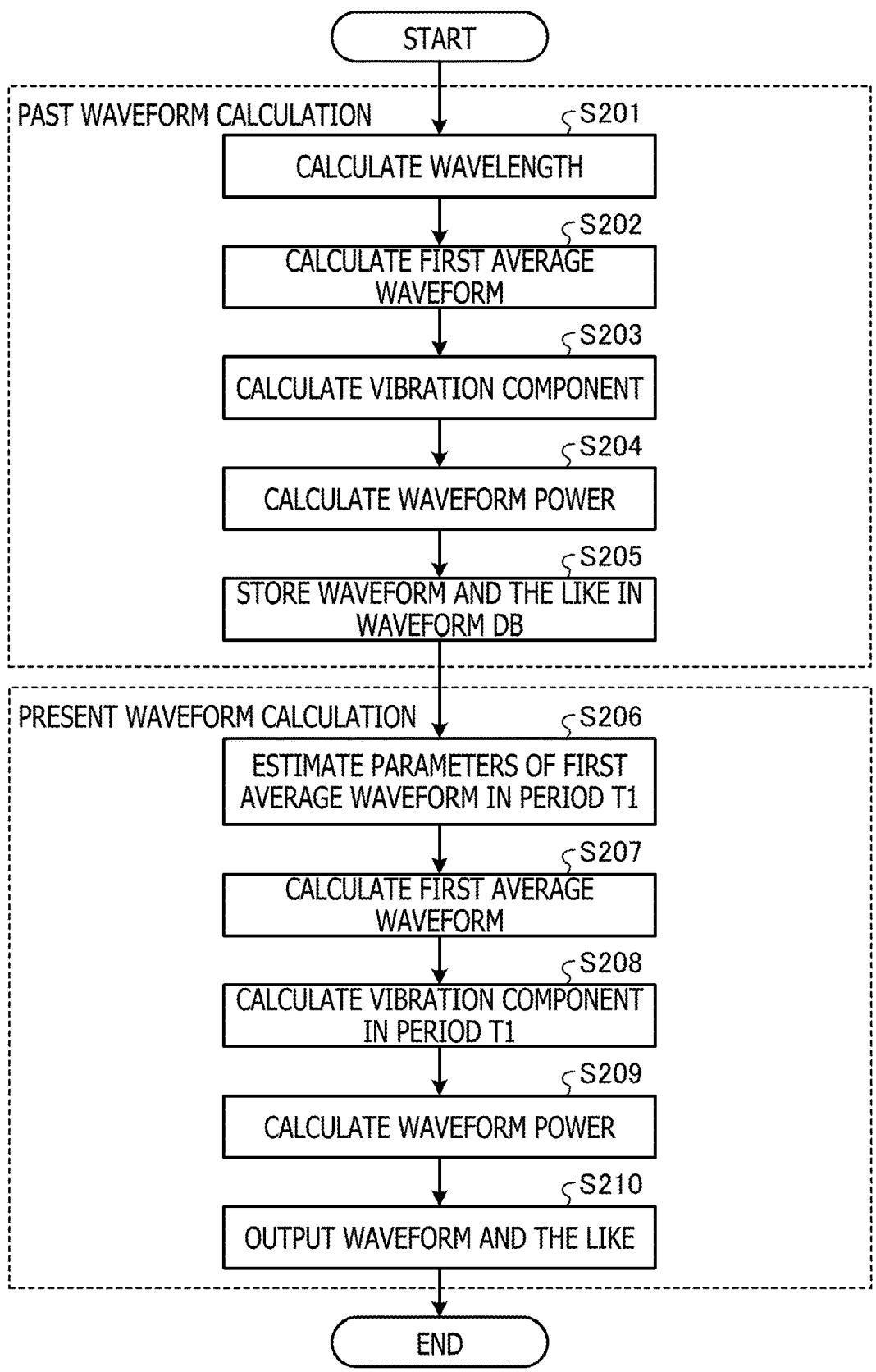
FIG. 14 is a flowchart illustrating a flow of waveform estimation processing.

FIG. 14 is a flowchart illustrating a flow of waveform estimation processing. The following description will be made of the short-cycle waveform estimation processing performed by the first waveform estimating unit 22. Incidentally, the waveform estimation processing performed by the second and third waveform estimating units 23 and 24 is similar to the short-cycle waveform estimation processing, and therefore the description will be omitted.

As illustrated in FIG. 14, the first waveform estimating unit 22 performs past waveform calculation. For example, the past waveform calculating unit 211 calculates a wavelength (S201), calculates a first average waveform (S202), and calculates a vibration component (S203). Next, the past waveform calculating unit 211 calculates waveform power (S204), and stores the respective calculated waveform and the like in the waveform DB 14 (S205).

Next, the first waveform estimating unit 22 performs present waveform calculation. For example, the parameter estimating unit 212 estimates the parameters of the first average waveform in the period T1 (S206). Next, the average waveform calculating unit 213 calculates the first average waveform (S207). The vibration component calculating unit 214 calculates the vibration component from the first average waveform calculated in S207 (S208). Then, the waveform power calculating unit 215 calculates the waveform power of the vibration component calculated in S208 (S209). Thereafter, the first waveform estimating unit 22 outputs the respective waveform and the like to the processing units in subsequent stages (S210). The processing is then ended.

Figure 15:
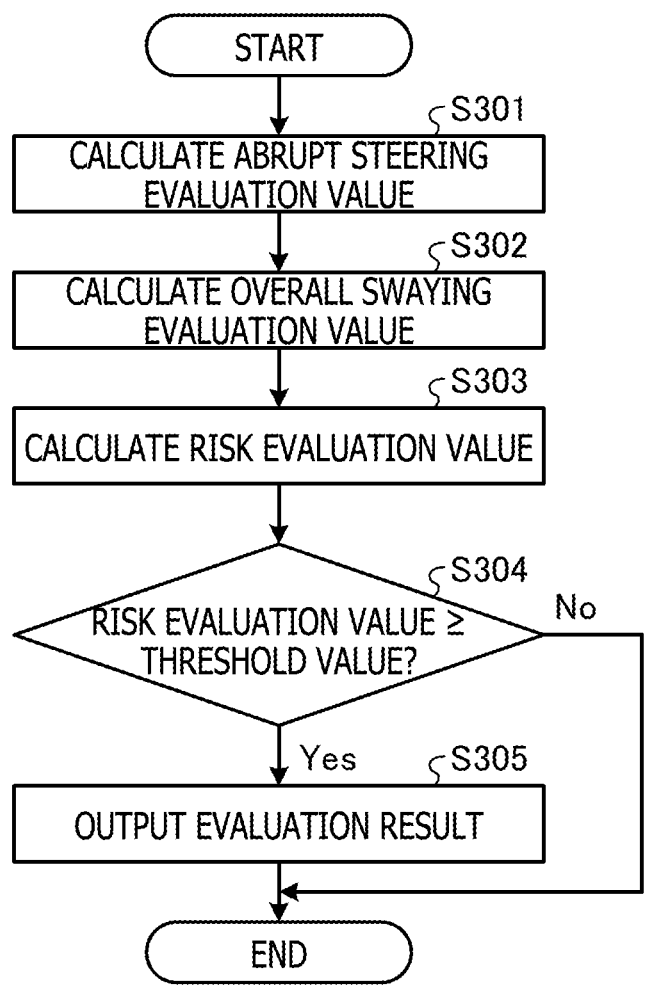
FIG. 15 is a flowchart illustrating a flow of danger determination processing.

FIG. 15 is a flowchart illustrating a flow of danger determination processing. As illustrated in FIG. 15, the steering evaluating unit 251 calculates the evaluation value of abrupt steering (abrupt steering score value sc1) (S301).

Next, the swaying evaluating unit 252 calculates the evaluation value of overall swaying (overall swaying score value sc2) (S302). Thereafter, the risk evaluating unit 253 calculates the evaluation value of a risk (risk score value sc3) based on the abrupt steering evaluation value calculated in S301 and the overall swaying evaluation value calculated in S302 (S303). Then, when the risk evaluation value is equal to or more than a threshold value (S304: Yes), the notifying unit 254 outputs the evaluation result to the automatic driving control device 2 (S305). When the evaluation value is less than the threshold value (S304: No), the processing is ended.

Effect

According to the foregoing embodiment, according to the input waveform corresponding to the driving trajectory, the first average waveform from the present time to a time preceding by the half wavelength of the vibration component is estimated, and the vibration component is calculated. In the estimation of the average waveform, the average waveform is estimated using the first average waveform before the time preceding the present time by the half wavelength in addition to the input waveform. Thus, the first average waveform up to the present time may be estimated with higher accuracy. It is thereby possible to separate the vibration component in each cycle from the driving trajectory in real time.

In addition, based on the vibration component in each cycle, the vibration component being separated in real time, overall swaying and abrupt steering are evaluated, and dangerous unsteadiness is detected. Thus, dangerous unsteadiness before leading to deviation may be accurately detected in real time, the dangerous unsteadiness occurring when it gradually becomes difficult to keep in a lane due to a decrease in concentration (potential danger). For example, because the vibration component in each cycle may be separated from the driving trajectory in real time, a time taken to detect dangerous unsteadiness of the vehicle may be shortened.

There is a device that accumulates data for a certain long time, and determines whether the driver is in an awakened state. On the other hand, the vehicle-mounted device 10 may detect dangerous unsteadiness in real time, and may avoid lane deviation from an earlier stage by notifying the automatic driving control device 2 at a time of the detection.

Second Embodiment

An embodiment of the present technology has been described thus far. However, the present technology may be carried out in various different forms in addition to the foregoing embodiment.

[Determining Method]

The calculation of the evaluation value by the danger determining unit 25 described in the foregoing embodiment is not limited to the concretely described calculation example. For example, the danger determining unit 25 may calculate the evaluation value using also the phase of in-lane swaying or the like from a vibration component in a short cycle.

For example, the steering evaluating unit 251 of the danger determining unit 25 illustrated in FIG. 12 may detect and evaluate abrupt steering of the driver using the lateral displacement of the vehicle, the phase of in-lane swaying, and the waveform power of the vibration component rt in the short cycle Ts.

For example, the steering evaluating unit 251 obtains a lateral displacement when the vehicle is traveling from the driving trajectory. In addition, the steering evaluating unit 251 calculates the phase of in-lane swaying from the vibration component in the short cycle. For example, the steering evaluating unit 251 calculates the phase of in-lane swaying (change in d in FIG. 2), which indicates timing of steering wheel operation (steering) of the driver in a long-term view. The phase calculated here indicates the timing of the steering wheel operation, and therefore indicates higher-risk steering at a road edge (swaying edge) represented by a solid line or a broken line as a white line. Incidentally, the steering evaluating unit 251 may calculate the phase using various publicly known methods.

Figure 16:
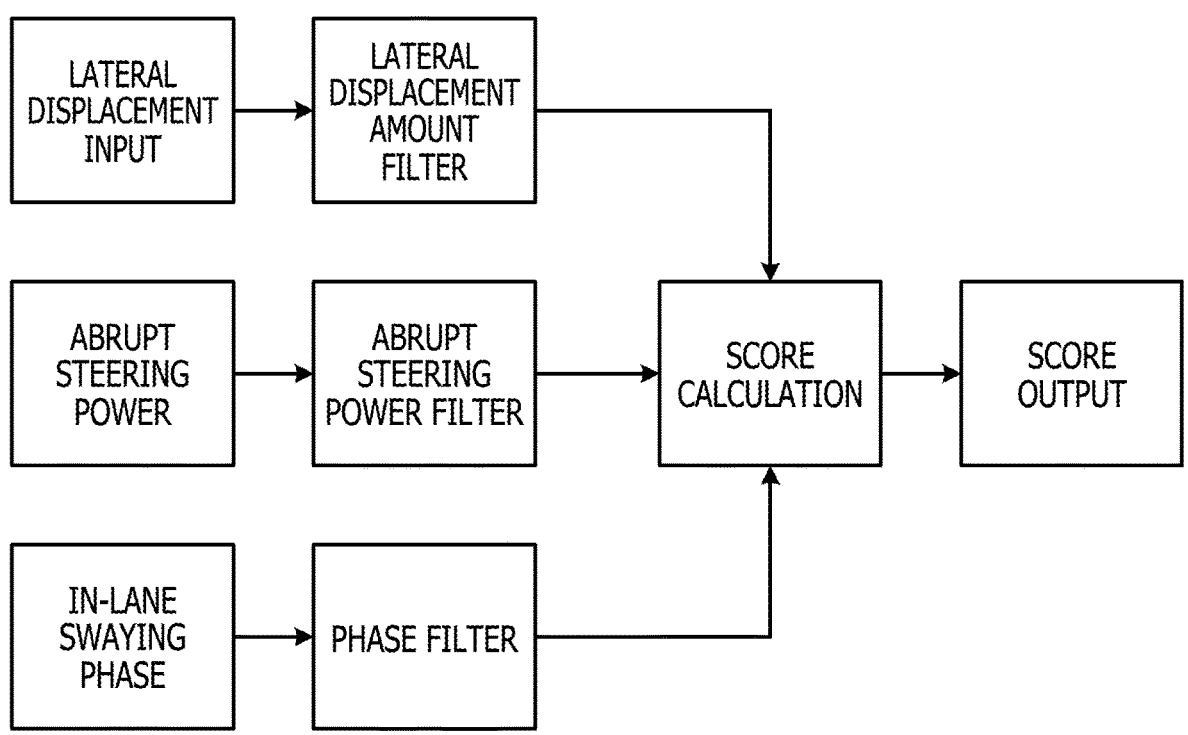
FIG. 16 is a diagram of assistance in explaining processing of a steering evaluating unit.

FIG. 16 is a diagram of assistance in explaining processing of a steering evaluating unit. The steering evaluating unit may be the steering evaluating unit 251 depicted in FIG. 12. As illustrated in FIG. 16, the steering evaluating unit 251 calculates a value normalized by applying a filter to the lateral displacement. Similarly, the steering evaluating unit 251 normalizes the waveform power (abrupt steering power) in the short cycle by applying a power filter thereto, and normalizes the phase of in-lane swaying by applying a phase filter thereto. Then, the steering evaluating unit 251 calculates an abrupt steering score value by adding the respective normalized values together, and outputs the abrupt steering score value to the risk evaluating unit 253.

Figure 17:
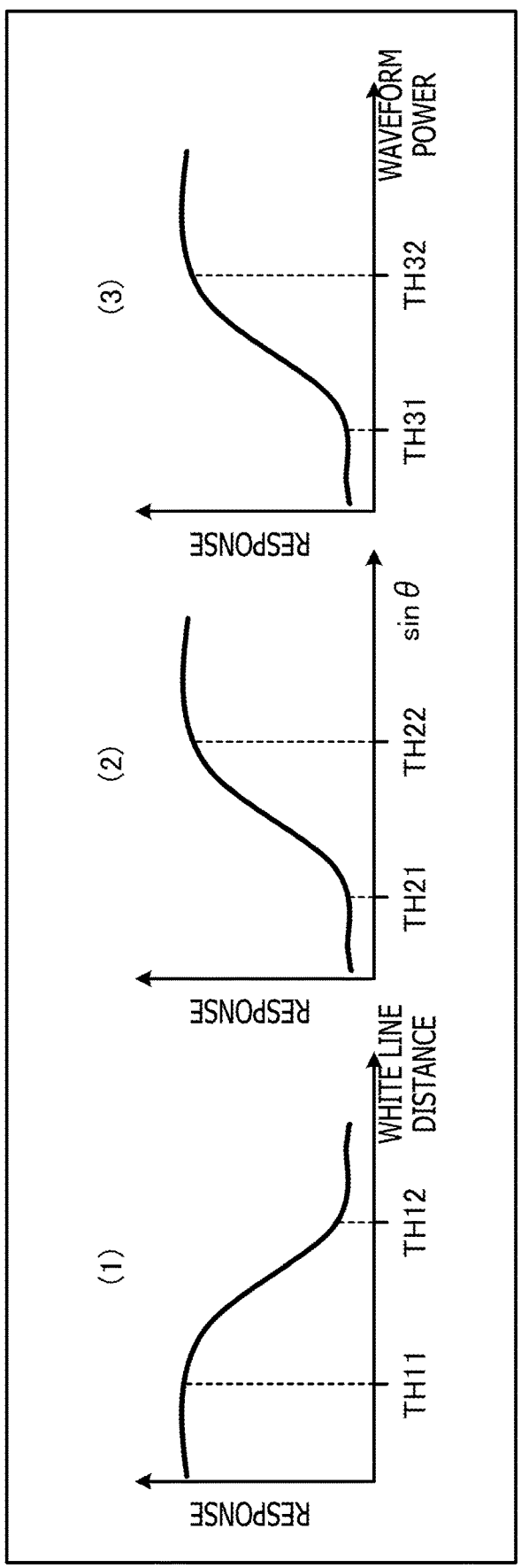
FIG. 17 is a diagram of assistance in explaining filters used for abrupt steering evaluation.

Each of the filters used by the steering evaluating unit 251 will be described in the following. FIG. 17 is a diagram of assistance in explaining filters used for abrupt steering evaluation. The filters illustrated in FIG. 17 are filters that saturate, for example, filters that saturate at both a small value and a large value. The filter illustrated in (1) of FIG. 17 is a filter for an amount of lateral displacement, is a filter that provides a response value according to a distance on a left side or a right side that is closer to a white line, and is a filter that indicates a high response value when the distance to the white line is short. For example, when the distance to the white line (white line distance) becomes longer than a short distance (TH11), the response value gradually changes to decrease, and when the white line distance exceeds a threshold value TH12, the response value converges to a fixed value.

The filter illustrated in (2) of FIG. 17 is a filter for the phase of in-lane swaying, and is a filter that calculates $\sin \theta$ from the phase $\theta$ of in-lane swaying, and exhibits a high response value when the phase is closer to a wave edge. For example, when a threshold value TH21 of the wave edge is exceeded, the response value increases gradually, and when a threshold value TH22 is exceeded, the response value converges to a fixed value.

The filter illustrated in (3) of FIG. 17 is a filter for abrupt steering power, and is a filter that responds strongly when a threshold value TH31 is exceeded. For example, a value closer to a response maximum value is returned at a threshold value TH32, which represents a higher power than the threshold value TH31. Incidentally, the threshold values TH11 to TH32 are each an individual threshold value, and are set in advance.

Figure 18:
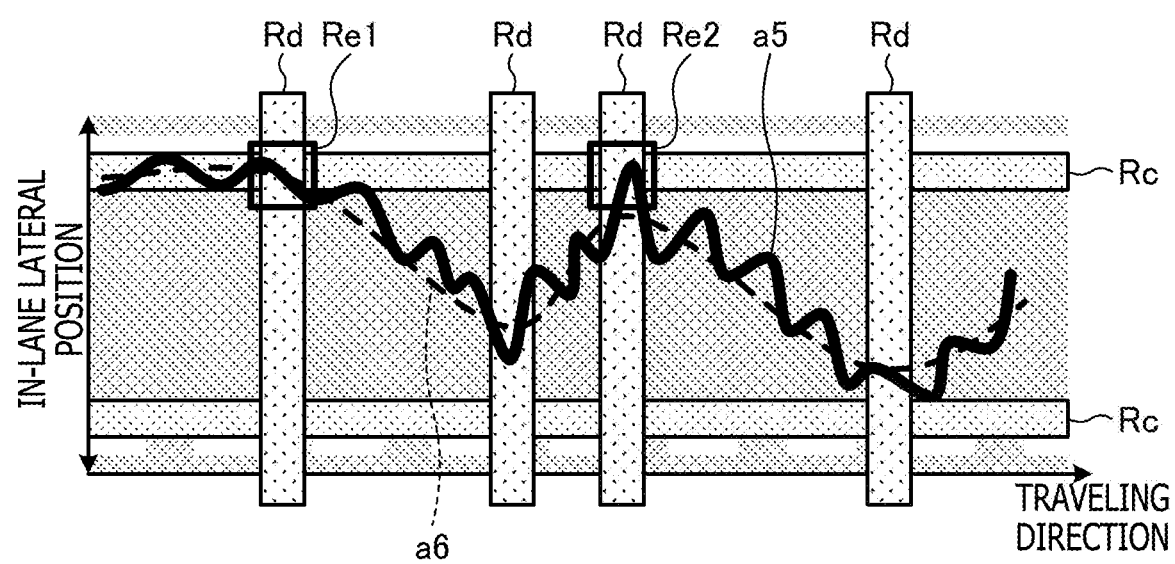
FIG. 18 is a diagram of assistance in explaining determination of abrupt steering.

Then, the steering evaluating unit 251 calculates a score value by adding up the respective values after the filter processing, and determines abrupt steering. Adding up the respective feature quantities after the filter processing provides a high evaluation value when all of the values after the filter processing are high. FIG. 18 is a diagram of assistance in explaining determination of abrupt steering.

a5 in FIG. 18 represents a high-frequency component of the driving trajectory. a6 in FIG. 18 represents a low-frequency component. The value of the amount of lateral displacement after the filter processing is high in regions $R_C$ in FIG. 18. The value of the phase of in-lane swaying after the filter processing is high in regions Rd in FIG. 18. Therefore, an evaluation result of abrupt steering correction appears more clearly in two regions Re1 and Re2 in FIG. 18. In the present example, of Re1 and Re2, Re2 where high-frequency power is higher is determined to be timing with a higher risk.

For example, the steering evaluating unit 251 may identify four parts as phase edges (Rd) by obtaining the phase of in-lane swaying from the driving trajectory. Next, the steering evaluating unit 251 extracts spots Re1 and Re2 where the vehicle is at a position close to the white line from the four identified parts based on lateral positions (a5) in the lane. Thereafter, the steering evaluating unit 251 identifies, from the spots Re1 and Re2, the spot Re2 where abrupt steering power in a short cycle is equal to or more than a threshold value. As a result, the steering evaluating unit 251 determines that dangerous driving has occurred at Re2 in the driving trajectory. Thus, the steering evaluating unit 251 narrows down to steering correction timing for avoiding deviation from the phase of in-lane swaying and the lateral position in the lane, and evaluates the abruptness of correction steering accompanying a decrease in a degree of concentration.

In addition, the swaying evaluating unit 252 illustrated in FIG. 12 may evaluate swaying of the driver using the waveform power of a vibration component in a long cycle and the waveform power of a vibration component in a medium cycle. For example, the swaying evaluating unit 252 calculates a score value indicating a risk by adding together the waveform power of in-lane swaying and the waveform power of normal steering.

Figure 19:
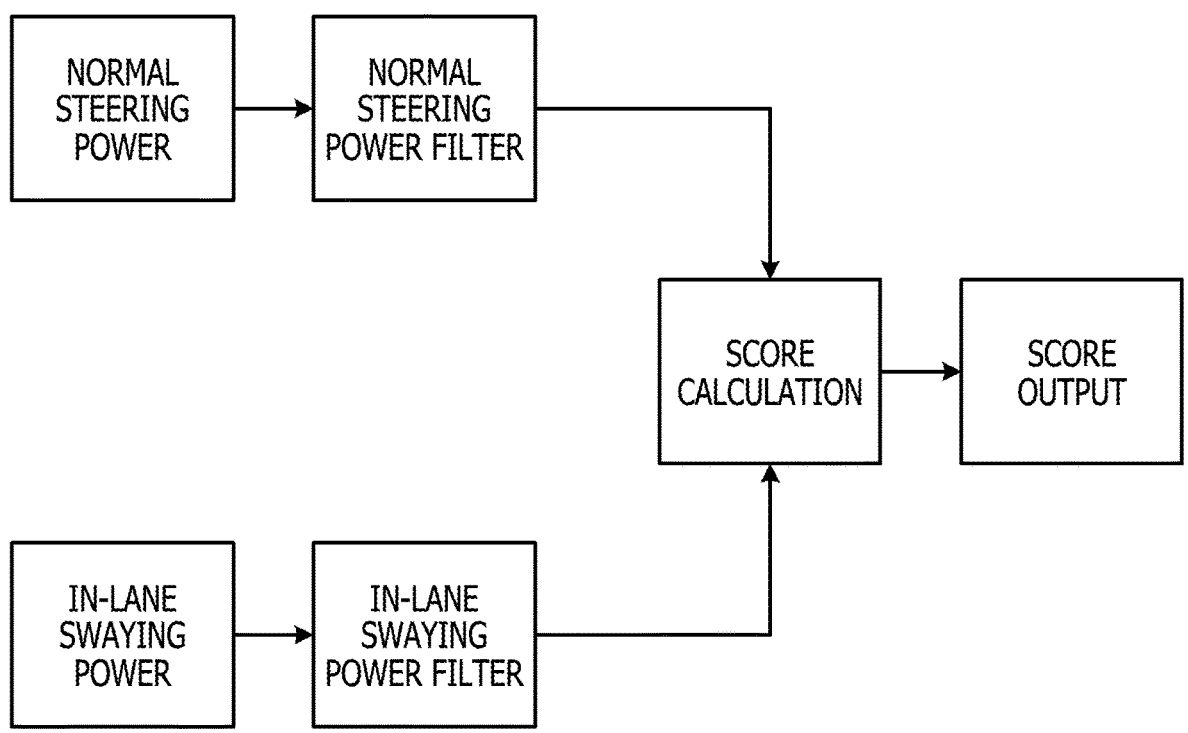
FIG. 19 is a diagram of assistance in explaining processing of a swaying evaluating unit.

FIG. 19 is a diagram of assistance in explaining processing of a swaying evaluating unit. The swaying evaluating unit may be the swaying evaluating unit 252 depicted in FIG. 12. As illustrated in FIG. 19, the swaying evaluating unit 252 normalizes the waveform power of in-lane swaying by applying a filter to the waveform power, and similarly normalizes the waveform power of normal steering by applying a filter to the waveform power. Then, the swaying evaluating unit 252 calculates a score value by adding together the respective waveform powers after the filter processing, and outputs the score value to the risk evaluating unit 253. Thus, the swaying evaluating unit 252 performs control so as to exclude an increase in the score value when one of the waveform powers is high, and increase the score value when both of the waveform powers are high.

Figure 20:
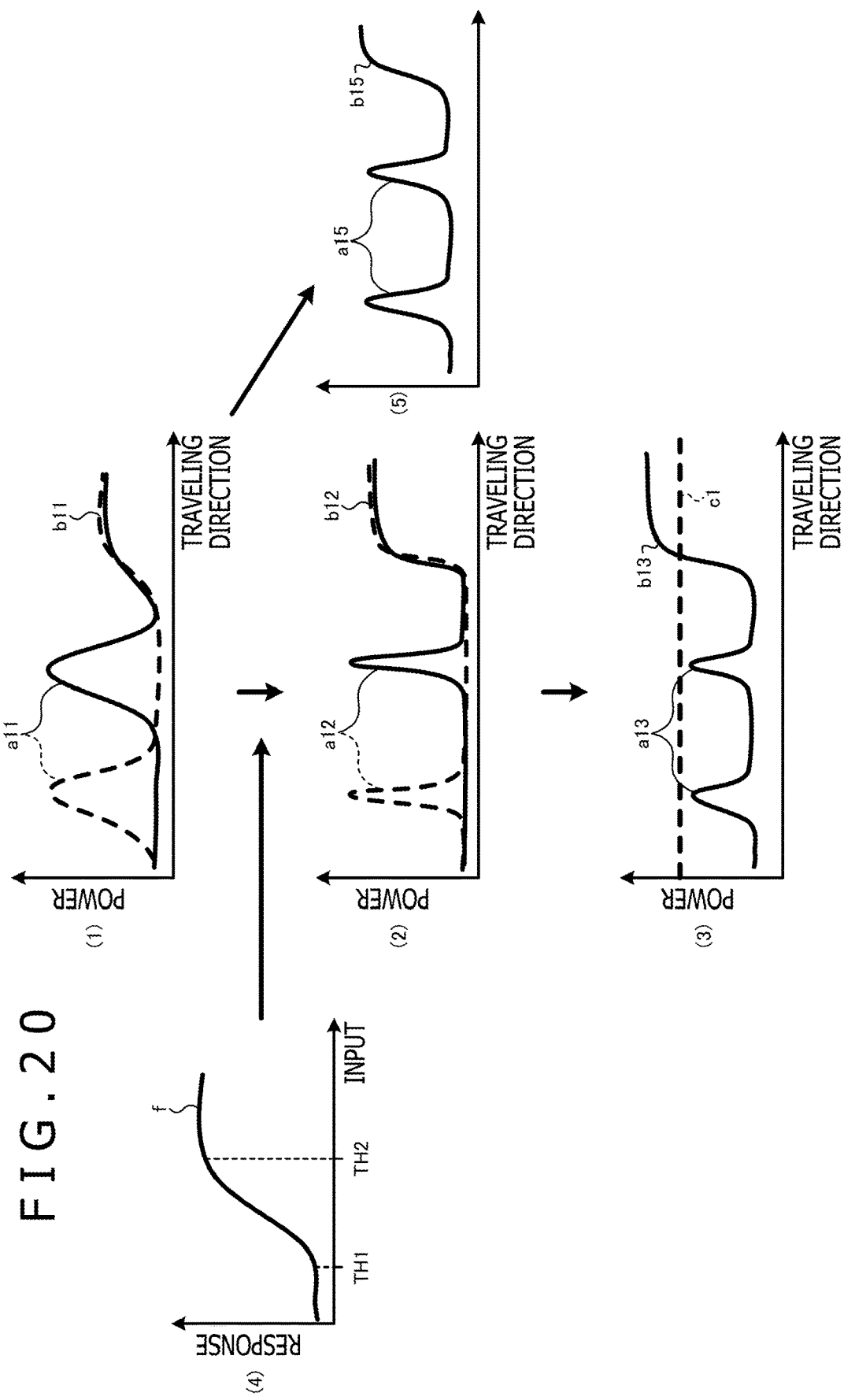
FIG. 20 is a diagram of assistance in explaining evaluation of overall swaying.

FIG. 20 is a diagram of assistance in explaining evaluation of overall swaying. FIG. 20 represents an example of time series changes in both the waveform power of in-lane swaying and the waveform power of normal steering. (1) of FIG. 20 illustrates two waveforms of in-lane swaying and normal steering. a11 indicates a state in which only one waveform power is high. b11 indicates a state in which both of the waveform powers are high.

A state in which such waveforms are simply added together is illustrated in (5) of FIG. 20. In (5) of FIG. 20, similar score values are obtained in a state of a15 in which only one waveform power is very high and states of b15 in which both of the waveform powers are slightly high. It is therefore difficult to determine whether both of the powers are increased. For example, such processing determines that normal steering of a driver having a peculiarity is also dangerous, and it is therefore difficult to identify conscious abrupt steering different from normal steering, for example, a really dangerous state.

On the other hand, the swaying evaluating unit 252 applies a filter illustrated in (4) to the two waveforms illustrated in (1) of FIG. 20. This filter has parameters differing between normal steering and in-lane swaying, but has same basic properties. For example, the filter has properties of responding with a value in the vicinity of a minimum value up to a low-power threshold value TH1, responding with a value in the vicinity of a maximum value above a high-power threshold value TH2, and responding according to the magnitude of power between the threshold values TH1 and TH2.

Then, the swaying evaluating unit 252 applies filter processing to the waveforms in (1) of FIG. 20 by the filter of (4) in FIG. 20. The response values of both of the waveform powers in a state in which both of the powers are high (b11) are thereby increased (b12). Thereafter, the swaying evaluating unit 252 performs simple addition of both of the obtained powers after the filter processing. A waveform illustrated in (3) of FIG. 20 may be thereby obtained. Incidentally, a power ratio may be further set as a weight coefficient or the like as appropriate. In (3) of FIG. 20, b12 raised in (2) of FIG. 20 is a higher score than regions a13 as a result of the addition, and exceeds c1, which is an overall swaying risk reference set in advance.

By thus evaluating the waveform powers after the filter processing illustrated in (4) of FIG. 20, it is possible to evaluate a state in which both of the waveform powers of normal steering and in-lane swaying are increased in addition to the magnitudes of both of the waveform powers, and thus identify a continuous state of decreased concentration robustly. Incidentally, rises in different power ranges may be normalized and evaluated by setting the response value of each filter in a same range of, for example, 0 to 1.0.

Further, the risk evaluating unit 253 illustrated in FIG. 12 may calculate an evaluation value obtained by adding together the score value calculated by the steering evaluating unit 251 and the score value calculated by the swaying evaluating unit 252.

Incidentally, either of swaying evaluation and steering evaluation may be performed first, and the order of processing of the swaying evaluation and the steering evaluation may be changed arbitrarily. In addition, only one of the swaying evaluation and the steering evaluation may be performed, or both the swaying evaluation and the steering evaluation may be performed.

[Numerical Values]

The respective numerical values and the threshold values described in the foregoing embodiments are illustrative only, and are not limited to the concretely described values.

[System]

In addition, the respective configurations of the respective devices illustrated in FIG. 3 do not necessarily need to be physically configured as illustrated in the figure. For example, the respective configurations of the devices illustrated in FIG. 3 may be configured so as to be distributed or integrated in arbitrary units. For example, the first to third waveform estimating units 22 to 24 may be integrated with each other. Further, the whole or an arbitrary part of the respective processing functions performed in the respective devices may be implemented by a central processing unit (CPU) and a program analyzed and executed in the CPU, or may be implemented as hardware based on wired logic.

In addition, among the respective pieces of processing described in the present embodiment, the whole or a part of the processing described as being performed automatically may also be performed manually. Alternatively, the whole or a part of the processing described as being performed manually may also be performed automatically by a publicly known method. In addition, processing procedures, control procedures, specific names, and information including various kinds of data and parameters that are illustrated in the foregoing document and the drawings may be changed arbitrarily unless otherwise specified.

Figure 21:
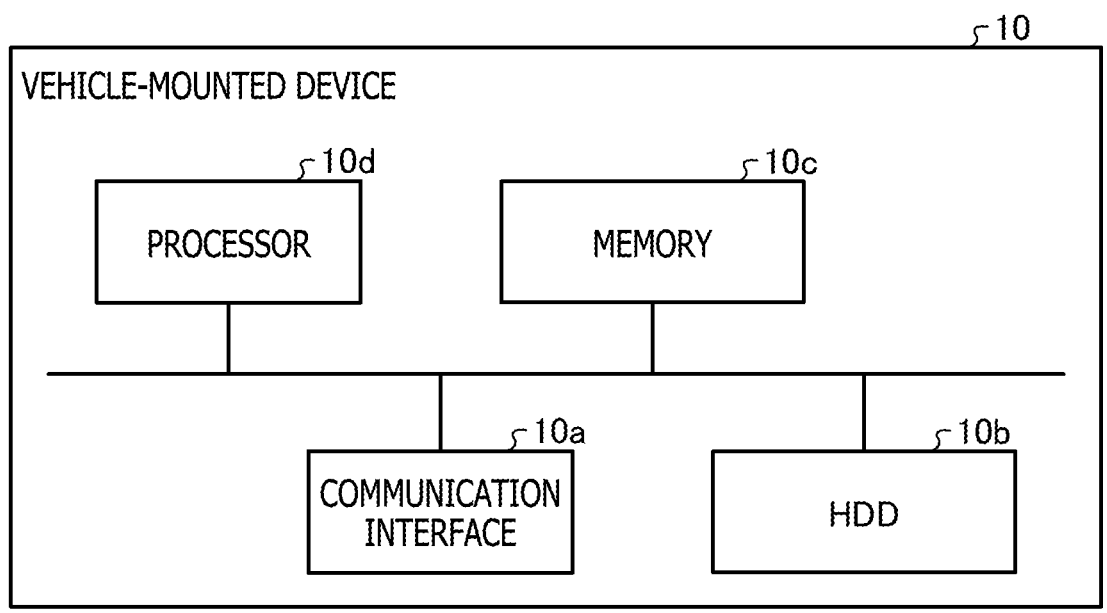
FIG. 21 is a diagram of assistance in explaining an example of a hardware configuration.

The vehicle-mounted device 10 described above may be implemented by a computer including a hardware configuration as follows, for example. FIG. 21 is a diagram of assistance in explaining an example of a hardware configuration. As illustrated in FIG. 21, the vehicle-mounted device 10 includes a communication interface 10a, a hard disk drive (HDD) 10b, a memory 10c, and a processor 10d.

An example of the communication interface 10a is a network interface card or the like. The HDD 10b is a storage device that stores the various DBs illustrated in FIG. 3 and the like.

Cited as an example of the memory 10c is a random access memory (RAM) such as a synchronous dynamic random access memory (SDRAM), a read only memory (ROM), or a flash memory. Cited as an example of the processor 10d is a CPU, a digital signal processor (DSP), a field programmable gate array (FPGA), a programmable logic device (PLD), or the like.

In addition, the vehicle-mounted device 10 operates as an information processing device that performs a waveform estimating method by reading and executing a program. For example, the vehicle-mounted device 10 executes a program that performs functions similar to those of the trajectory generating unit 21, the first waveform estimating unit 22, the second waveform estimating unit 23, the third waveform estimating unit 24, and the danger determining unit 25. As a result, the vehicle-mounted device 10 may execute a process that performs functions similar to those of the trajectory generating unit 21, the first waveform estimating unit 22, the second waveform estimating unit 23, the third waveform estimating unit 24, and the danger determining unit 25. It is to be noted that the program referred to in the present other embodiment is not limited to being executed by the vehicle-mounted device 10. For example, the present technology may be similarly applied to a case where another computer or a server executes the program or a case where the other computer and the server execute the program in cooperation with each other.

The program may be distributed via a network such as the Internet. In addition, the program may be recorded on a computer readable recording medium such as a hard disk, a flexible disk (FD), a compact disc-read only memory (CD-ROM), a magneto-optical disk (MO), or a digital versatile disc (DVD), and executed by being read from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A waveform estimating device comprising:
a memory, and
a processor coupled to the memory and configured to perform a process including:
estimating a first vibration component of less than a first frequency in a period from a present time to a time preceding by a half wavelength of the first frequency, using an input waveform in the period, the input waveform corresponding to a driving trajectory of a vehicle traveling on a roadway;
calculating a second vibration component of the first frequency or higher in the period based on the first vibration component and the input waveform;
estimating a third vibration component of less than a second frequency in a second period from the present time to a time preceding by a half wavelength of the second frequency, using the first vibration component in the second period, where the second frequency is less than the first frequency;
calculating a fourth vibration component of less than the first frequency and equal to or greater than the second frequency by subtracting the third vibration component from the first vibration component; and
determining a risk related to driving of a vehicle based on a characteristic value of the second vibration component and the fourth vibration component
wherein the input waveform is a driving trajectory of the vehicle.

2. The waveform estimating device according to claim 1, wherein in the calculating, the second vibration component is obtained by subtracting the first vibration component from the input waveform.

3. The waveform estimating device according to claim 1, the process further including:
calculating the first vibration component in a period further preceding the time preceding by the half wavelength of the first frequency, using the input waveform up to the present time, and
in the estimating, the first vibration component using the first vibration component in the period further preceding the time preceding by the half wavelength of the first frequency.

4. The waveform estimating device according to claim 1, wherein in the estimating, the first vibration component is estimated so as to minimize a difference from the input waveform in the period from the present time to the time preceding by the half wavelength of the first frequency.

5. The waveform estimating device according to claim 1, wherein in the estimating, the first vibration component is estimated based on coefficients of a polynomial model minimizing differences between the first vibration component and the input waveform in the period from the present time to the time preceding by the half wavelength of the first frequency.

6. A waveform estimating method performed by a computer, the waveform estimating method comprising:
estimating a first vibration component of less than a first frequency in a period from a present time to a time preceding by a half wavelength of the first frequency, using an input waveform in the period, the input waveform corresponding to a driving trajectory of a vehicle traveling on a roadway;
calculating a second vibration component of the first frequency or higher in the period by subtracting the first vibration component from the input waveform;
estimating a third vibration component of less than a second frequency in a second period from the present time to a time preceding by a half wavelength of the second frequency, using the first vibration component in the second period, where the second frequency is less than the first frequency;

calculating a fourth vibration component of less than the first frequency and equal to or greater than the second frequency by subtracting the third vibration component from the first vibration component; and determining a risk related to driving of a vehicle based on a characteristic value of the second vibration component and the fourth vibration component wherein the input waveform is a driving trajectory of the vehicle.

7. A computer-readable non-transitory storing medium storing a waveform estimation program that causes a computer to perform a process comprising:

estimating a first vibration component of less than a first frequency in a period from a present time to a time preceding by a half wavelength of the first frequency, using an input waveform in the period, the input waveform corresponding to a driving trajectory of a vehicle traveling on a roadway;

calculating a second vibration component of the first frequency or higher in the period by subtracting the first vibration component from the input waveform;

estimating a third vibration component of less than a second frequency in a second period from the present time to a time preceding by a half wavelength of the second frequency, using the first vibration component in the second period, where the second frequency is less than the first frequency;

calculating a fourth vibration component of less than the first frequency and equal to or greater than the second frequency by subtracting the third vibration component from the first vibration component; and determining a risk related to driving of a vehicle based on a characteristic value of the second vibration component and the fourth vibration component wherein the input waveform is a driving trajectory of the vehicle.

* * * * *